(12) United States Patent
Miramonti et al.

(10) Patent No.: US 9,647,436 B2
(45) Date of Patent: May 9, 2017

(54) ELECTRIC SECTOR CABLES

(75) Inventors: Gianni Miramonti, Milan (IT); Sergio Montagner, Milan (IT)

(73) Assignee: PRYSMIAN S.p.A. (IT)

( * ) Notice: Subject to any disclaimer, the term of this patent is extended or adjusted under 35 U.S.C. 154(b) by 106 days.

(21) Appl. No.: 13/883,705

(22) PCT Filed: Nov. 17, 2010

(86) PCT No.: PCT/EP2010/067640
§ 371 (c)(1),
(2), (4) Date: Jul. 9, 2013

(87) PCT Pub. No.: WO2012/065634
PCT Pub. Date: May 24, 2012

(65) Prior Publication Data
US 2013/0284481 A1    Oct. 31, 2013

(51) Int. Cl.
*H02G 9/00* (2006.01)
*H01B 9/00* (2006.01)
*H01B 7/14* (2006.01)

(52) U.S. Cl.
CPC ............... *H02G 9/00* (2013.01); *H01B 9/006* (2013.01); *H01B 7/14* (2013.01)

(58) Field of Classification Search
CPC .......... H01B 9/006; H01B 7/14; H01B 5/105; H02G 9/00
USPC .......................................................... 174/37
See application file for complete search history.

(56) References Cited

U.S. PATENT DOCUMENTS

| 2,000,355 | A | * | 5/1935 | Sichtermann | .................... 174/27 |
| 3,164,670 | A | * | 1/1965 | Ege | ............................ 174/128.1 |
| 3,823,542 | A | * | 7/1974 | Pemberton | ........................ 57/15 |
| 4,175,212 | A | * | 11/1979 | Artbauer | ............. H01B 9/0638 |
| | | | | | 174/128.1 |
| 4,550,559 | A | * | 11/1985 | Thomson | ........................ 57/223 |
| 4,687,884 | A | * | 8/1987 | DeHart | ......................... 174/130 |
| 4,690,497 | A | * | 9/1987 | Occhini et al. | ................ 385/107 |
| 5,133,121 | A | * | 7/1992 | Birbeck et al. | ................. 29/872 |
| 5,449,861 | A | * | 9/1995 | Fujino et al. | .................. 174/113 A |
| 6,313,409 | B1 | * | 11/2001 | Bales et al. | ................ 174/128.1 |
| 6,395,975 | B1 | | 5/2002 | Bosisio et al. | |
| 7,368,162 | B2 | * | 5/2008 | Hiel et al. | .................. 428/300.7 |

(Continued)

FOREIGN PATENT DOCUMENTS

| DE | 398516 | 7/1924 |
| DE | 398516 C | 7/1924 |

(Continued)

OTHER PUBLICATIONS

International Search Report dated Jul. 26, 2011 (previously submitted).

*Primary Examiner* — William H Mayo, III
*Assistant Examiner* — Hiram E Gonzalez
(74) *Attorney, Agent, or Firm* — MH2 Technology Law Group LLP

(57) ABSTRACT

A high voltage electric cable having a longitudinal axis may include: a conductive core having a first cross sectional area; wherein the conductive core includes a solid, central conductor, and at least three solid, sector conductors stranded around the central conductor. The central conductor may have a second cross sectional area. A ratio of the second cross sectional area to the first cross sectional area may be of from $\frac{1}{130}$ to $\frac{1}{20}$.

13 Claims, 3 Drawing Sheets

(56) References Cited

U.S. PATENT DOCUMENTS

| | | | |
|---|---|---|---|
| 7,409,816 B2* | 8/2008 | Susai et al. | 57/231 |
| 2007/0128435 A1* | 6/2007 | Hiel | B29C 70/52 |
| | | | 428/375 |

FOREIGN PATENT DOCUMENTS

| | | |
|---|---|---|
| DE | 3630918 A1 | 3/1988 |
| GB | 303666 A | 1/1929 |
| GB | 342308 A | 1/1931 |
| GB | 2029630 A | 3/1980 |

\* cited by examiner

ELECTRIC SECTOR CABLES

CROSS-REFERENCE TO RELATED APPLICATION(S)

This application is a national stage entry from International Application No. PCT/EP2010/067640, filed on Nov. 17, 2010, in the Receiving Office of the European Patent Office, the entire contents of which are incorporated herein by reference.

TECHNICAL FIELD

The present invention relates to the field of electric cables, i.e. cables for electric power transmission. In particular, the present invention relates to a high voltage electric cable.

BACKGROUND ART

High voltage electric cables are typically used for transporting electric power from the transmission network to the primary distribution. A high voltage electric cable can be a submarine cable or an underground cable which connects a power plant site to a primary distribution network.

The voltage associated to the transport of electric power in high voltage systems is typically higher than 35 kV. In addition a high voltage electric cable usually transports a notably high electric current rate.

An electric cable typically comprises a core of conductive material (e.g. copper or aluminium) whose cross section has an area that depends on the electric current rate that the cable must transport. Typically for high voltage applications, the cross section of a cable core has an area ranging between about 400 mm$^2$ and 2500 mm$^2$.

An example of an electric cable used for high voltage applications is the so called "sector cable" disclosed, for example, by U.S. Pat. No. 4,550,559. This document relates to a cable comprising at least one layer of strands with each strand covered with an individual sheath of rubber or plastic material. The sheaths are so shaped that the sheaths of adjacent strands interlock. In particular, the side surfaces of adjacent sheaths are in face-to-face engagement, while the wider surfaces of the strands form continuous cylindrical outer surface to the cable. The cable is made of a sheathed core strand surrounded by six equiangularly spaced strands. Each strand may comprise a plurality (say 200) of cords, each individually surrounded by rubber or similar material.

U.S. Pat. No. 4,175,212 discloses a gas filled high voltage cable in which the inner conductor is constructed from plural elements arranged on a carrier tube in one or several layers. The conductive elements are stranded around the carrier while remaining spaced from each other so that they can deform azimuthally in a wave-like pattern whenever their temperature increases. In particular, the inner conductor is contained in a tubular outer conductor or shield and the space between them is filled with insulative gas. The inner conductor is composed of six segments, e.g. of aluminium or copper. The segments are mounted on top of a tubular support element made, e.g. of metal, that may be a solid tube in which case it may also serve as a conduit for a coolant.

SUMMARY OF THE INVENTION

In high voltage electric cables voids in the conductive core should be as reduced as possible. Due to the presence of voids, the cross section conductive area of known sector cables is considerably less than the overall cross section area. Consequently, for a given conductor external diameter, the electric current density that the cable is able to transport is reduced, especially for direct current applications.

Further, water-blocking materials (for instance water swellable powders or gel) should be used to fill the voids. Those materials are suitable for blocking the propagation of moisture and/or water that may accidentally penetrate into the cable, which is a critical issue especially for submarine, but also for underground cables.

Moreover, while the sector cable of U.S. Pat. No. 4,550,559 requires a complicated manufacturing process because of the plurality of strands, the cable of U.S. Pat. No. 4,175,212 suffer from flexibility problems.

In view of the above, the Applicant has tackled the problem of providing a high voltage electric sector cable in which the presence of voids in the conductive core is minimized, so that—for a given external diameter—the cross section conductive area is larger than that of known sector cables having an equivalent outer conductor diameter. Indeed, increasing the conductive area advantageously leads to increasing the electric current density that the cable is able to transport, in particular for direct current applications.

In addition, the Applicant has tackled the problem of providing a high voltage electric sector cable which is more flexible than the known sector cables, especially when the conductive area is larger than 1000 mm$^2$. Up to a given cross section (e.g. 1000 mm$^2$) the cable flexibility is not generally an issue, because the conductor portions can be deformed as a whole with a limited strength. However, with greater cross sections, the conductor portion size get big enough to require considerable force to be bent, unless special solutions are adopted in the conductor design.

The Applicant found that a high voltage electric cable with a conductive cross section area larger than 1000 mm$^2$ and a conductive core made of solid conductors having substantially trapezoidal cross section (hereinafter also referred to as "sector conductors") stranded around a solid central conductor has a flexibility suitable for coiling when the solid central conductor has a cross section area of from $1/130$ to $1/20$ of the overall conductive cross section.

The Applicant has found that a central conductor cross section area lying within the range mentioned above advantageously guarantees that the central conductor supports the stranding of the sector conductors and that, in the meanwhile, the cable is flexible even when the overall area of the cable conductive core cross section is larger than 1000 mm$^2$. In particular, the conductor arrangement of the cable of the invention allows producing a cable with a conductive area larger than 1000 mm$^2$. More in particular, the conductive area of the cable of the invention may be larger than 1600 mm$^2$.

Further, in the cable according to the present invention, central conductor and sector conductors are made of aluminium. Use of aluminium allows increasing the flexibility of the cable.

In the present description and in the claims, the expression "solid conductor" designates a conductor formed by a single conductive piece, whose cross section has no voids within its contour.

In such a cable, the sector conductors substantially abut one another so that substantially no voids are present between adjacent conductors.

On one hand, this allows increasing the electrical conductivity of the cable relative to the above cited known cables, while keeping its external diameter constant. On the other hand, this allows reducing the external diameter of the cable relative to the above cited known cables, while keeping its electrical conductivity constant.

Moreover, the minimization of voids achieved in the cable according to the present invention advantageously leads to notably reducing or even avoiding the use of water blocking materials that are needed in the known cables to block the accidental propagation of moisture and/or water. Avoiding water blocking materials advantageously leads to lessening the cable manufacturing complexity and costs.

According to a first aspect, the present invention provides a high voltage electric cable having a longitudinal axis and comprising a conductive core having a first cross section area, the conductive core comprising a solid, central conductor and at least three solid, sector conductors stranded around said central conductor, the central conductor having a second cross section area, the ratio between the second and first cross section areas being of from $1/130$ to $1/20$.

Preferably, the ratio between said the second and first cross section areas is of from $1/65$ to $1/20$, more preferably of from $1/65$ to $1/25$.

Preferably, the central conductor and the sector conductors are made of aluminium.

Preferably, each one of the sector conductors rests against the central conductor.

Preferably, each one of the sector conductors rests against adjacent sector conductors.

Preferably, all of the sector conductors have the same size and shape.

Preferably, the first cross section area of the conductive core is greater than 1,000 mm$^2$. In the case of an alternating current (AC) cable, the first area of the conductive core can be up to 1,600 mm$^2$. In the case of a direct current (DC) cable, there are no technical reasons for envisaging an upper limit of the first area of the conductive core, said first area possibly reaching 4,000 mm$^2$ or more.

A number of sector conductors lower than 3 would result in a cable with unsatisfactory flexibility. Preferably, the number of sector conductors is up to 9. A number of sector conductors higher than 9 would result in a cable with structural instability, for example one or more sector conductors could get displaced in case of bending, possibly damaging the surrounding cable layers.

For a cable with a first cross section area of the conductive core up to 2000 mm$^2$, a number of sector conductors up to 5 is preferred. For a cable with a first cross section area of the conductive core exceeding 2000 mm$^2$, a number of sector conductors equal to or higher than 6 is preferred.

The central conductor can have any suitable cross section shape, circular cross section being preferred.

Preferably, each one of the sector conductors has a cross section with a substantially trapezoidal shape, wherein the cross section has a major basis, a minor basis, a first side and a second side.

Preferably, the major basis is an arc of a circle.

As for the minor basis of the sector conductors, it can be straight or an arc of a circle. In case of a low number of sector conductors (for example three or four), the minor basis of the sector conductors is preferably an arc of a circle. In case of a high number of sector conductors (for example five or more), the minor basis of the sector conductors is advantageously straight. In the latter case the voids possibly formed at the interface with the central conductor are negligible, if not suppressed during the step of stranding of the sector conductors around the central conductor. The manufacturing of sector conductors with a straight minor basis was found to be easier.

When the minor basis is an arc of a circle, said arc of a circle is concentric with the arc of a circle of the respective major basis and has a diameter substantially equal to a diameter of a circular central conductor cross section.

According to advantageous embodiments, the first side has a blocking recess and the second side has a blocking tooth whose shape and size matches shape and size of the blocking recess.

Preferably, the cable comprises water blocking material. Besides being positioned in the voids possibly forming, the water blocking material can be provided at the interface between sector conductors and among sector conductors and central conductor.

More preferably, the water blocking material comprises at least one tape of a water swellable gel or a water swellable powder.

More preferably, the water blocking material comprises at least one of: a cellulose derivative and a thermo-stable loaded silicone polymer.

Advantageously, the high voltage electric cable according to the invention is a submarine cable.

BRIEF DESCRIPTION OF THE DRAWINGS

Embodiments of the invention will be better understood by reading the following detailed description, given by way of example and not of limitation, to be read with reference to the accompanying drawings, wherein.

DETAILED DESCRIPTION OF PREFERRED EMBODIMENTS OF THE INVENTION

Figure 1:
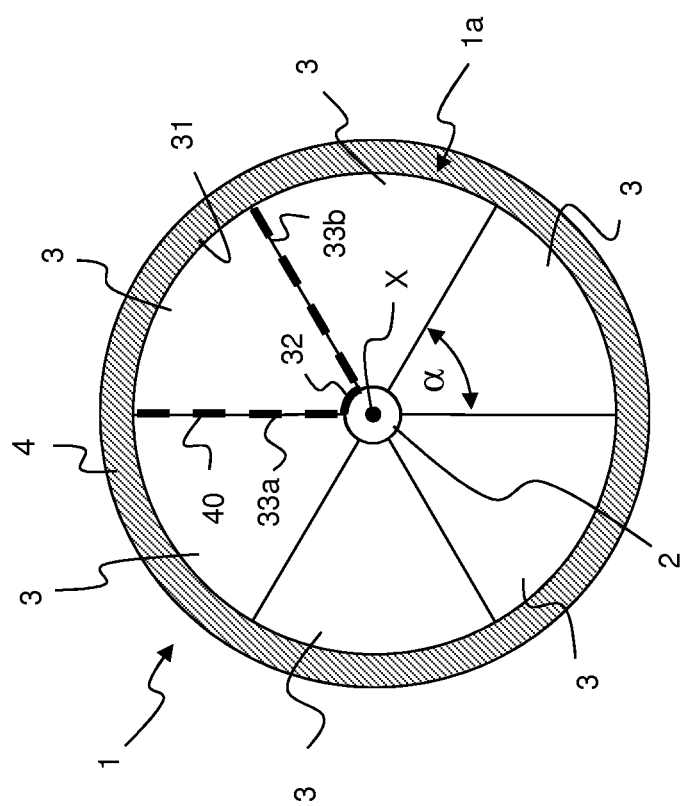
FIG. 1 is a cross section view of a high voltage electric sector cable according to an embodiment of the present invention.

FIG. 1 shows a high voltage electric sector cable 1 (hereinafter simply referred to as "cable") according to an embodiment of the present invention.

The cable 1 comprises a conductive core 1a in turn comprising a central conductor 2 and a number M of sector conductors 3, all of the conductors 2, 3 being solid. The number M is preferably equal to or higher than three and equal to or lower than nine. By way of example, the cable 1 of FIG. 1 comprises six sector conductors.

The central conductor 2 is a solid, elongated conductor having, in the present case, a substantially circular cross section. As mentioned above, the term "solid" means that the central conductor 2 is formed by a single conductive piece, whose cross section has no voids within its contour. The central conductor 2 has a longitudinal axis that substantially coincides with the longitudinal axis X of the cable 1 (i.e. the central conductor 2 is coaxial with the longitudinal axis X of the cable 1). The central conductor 2 is made of a conductive metal, preferably of aluminium, more preferably annealed aluminium.

The sector conductors 3 are solid, elongated sector conductors. As mentioned above, the term "solid" means that each sector conductor 3 is formed by a single conductive piece, whose cross section has no voids within its contour. The cross section of each sector conductor 3 is substantially trapezoidal, and has a major basis 31, a minor basis 32, a first side 33a and a second side 33b. In the present case, the major basis 31 is curved, i.e. its profile is an arc of a circle. Such a configuration gives place to a cable 1 of substantially circular cross section. In the present case, the minor basis 32 is curved, i.e. is an arc of a cycle concentric with the major basis 31 and having substantially the same diameter as the central conductor 2. This latter minor basis 32 configuration provides an amount of voids in the conductive core 1a lower than the configuration wherein the minor basis is straight.

Each sector conductor 3 is made of a conductive metal. Preferably, each sector conductor 3 is made of aluminium, more preferably of annealed aluminium. Advantageously, the use of aluminium to manufacture both the central conductor 2 and the sector conductors 3 allows increasing the flexibility of the cable 1. Advantageously, the use of annealed aluminium increases the elongation at break of cable 1.

Preferably, all the sector conductors 3 have cross sections with the same shape and area. Each sector conductor 3 has a cross section with an angular width α substantially equal to 360°/M. For the cable 1 shown in FIG. 1, comprising six sector conductors 3, the angular width α of the cross section of each sector conductor 3 is substantially equal to 60°.

The sector conductors 3 are arranged around the central conductor 2. In particular, the sector conductors 3 are stranded around the central conductor 2. The stranding step of the sector conductors 3 may be, for instance, of from 1200 mm to 1800 mm.

The sector conductors 3 are preferably tightly stranded around the central conductor 2. In particular, each sector conductor 3 has its minor basis 32 that substantially rests against the central conductor 2. Moreover, each sector conductor 3 has its first side 33a and second side 33b that substantially rest against the adjacent sector conductors 3 situated on its opposite sides.

This way, the central conductor 2 and the sector conductors 3 form a substantially solid void-free conductive core having a circular cross section. The overall cross section area of the conductive core 1a is substantially equal to the sum of the cross section area of the central conductor 2 and the cross section areas of all the sector conductors 3.

Preferably, the cross section area of each sector conductor 3 is such that the overall cross section area of the conductive core 1a is larger than 1000 mm$^2$, more preferably larger than 1600 mm$^2$.

The cross section area of the central conductor 2 is equal to a fraction of the overall cross section area of the conductive core 1a, this fraction being of from 1/130 to 1/20 of the overall conductive cross section area. For instance, if the cross section area of the conductive core is equal to 2500 mm$^2$, the cross section area of the central conductor 2 is at least 1/65 of said cross section area.

Advantageously, a central conductor 2 whose cross section area is comprised within the range defined above guarantees a suitable support for the stranding of the sector conductors 3 and, in the meanwhile, provides the cable 1 with suitable flexibility, even when the overall cross section area of the conductive core is larger than 1000 mm$^2$.

The cable 1 of the present invention can comprise water blocking material 40 (depicted as a dashed line partially contouring one sector only in FIG. 1 for sake of simplicity).

The water-blocking material 40 can be, for example, water swellable gel or powder tapes. The water blocking material 40 may be based, for example, on cellulose derivative such as carboxymethylcellulose or hydroxypropyl cellulose, optionally admixed with silicon grease. Alternatively, the water-blocking material may be made of a thermo-stable loaded silicone polymer (and added with silicone oil in a percentage equal to 7%). Advantageously, such polymer may also act as a lubricant and it has a substantially constant viscosity over temperature.

The water-blocking material 40 advantageously fill the voids that may be accidentally formed between the central conductor 2 and the sector conductors 3 and between adjacent sector conductors 3 during the stranding operation. This way, accidental penetration of moisture and/or water into the cable 1 is advantageously prevented.

The cable 1 comprises a number of tubular layers surrounding the cable conductive core 1a. Such tubular layers may comprise e.g. insulating layers, semiconductive layers and metal shields. In FIG. 1, for sake of simplicity, a single tubular layer 4 surrounding the sector conductors 3 is shown. The tubular layer 4 is made of a suitable semi-conductive polymeric material (for example polyethylene-based mixture containing carbon black).

The cable 1 according to the present invention has a number of advantages.

Firstly, the solid central conductor and the solid sector conductors substantially abutting allow minimizing the presence of voids within the conductive core of the cable, and therefore allow increasing the conductive area and the electric current density that the cable may transport.

Further, the use of a central conductor having a relatively small cross section area allows, together with the use of aluminium, increasing the flexibility of the cable even when the cross section area of the cable conductive core is larger than 1000 mm$^2$.

The jointing of the cable according to the present invention is advantageously very simple. When cable lengths must be joined during installation, the junction between conductors, made for example by welding, is very simple, because it requires welding a very small number of conductors (M+1) in comparison to, for example, the number of conductive strands of the cable of U.S. Pat. No. 4,550,559. Advantageously, when sector and central conductors of the cable of the invention are made of aluminium, cold welding technique may be used, which is particularly convenient when submarine cables are considered.

Figure 2:
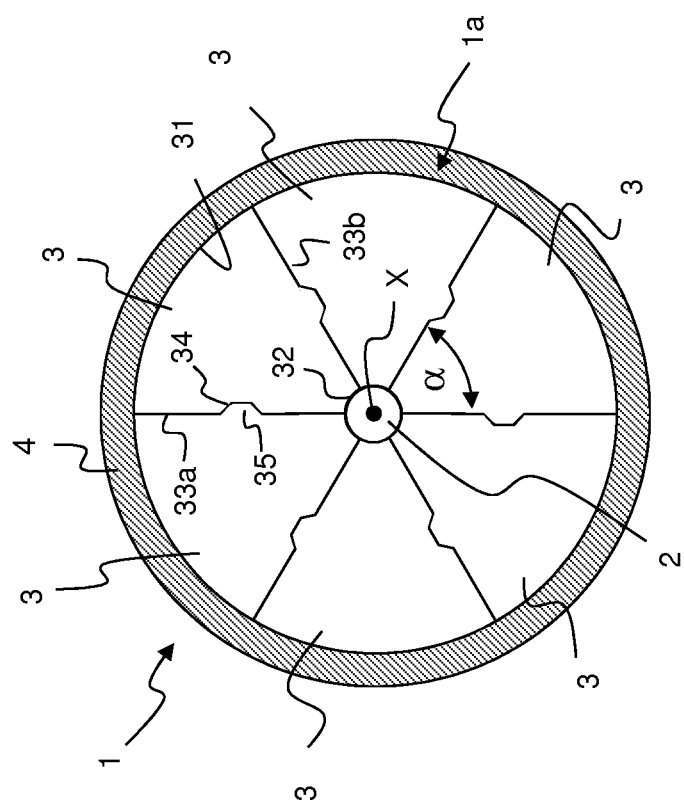
FIG. 2 is a cross section view of a high voltage electric sector cable according to another embodiment of the present invention.

In FIG. 2, the cross section of a cable 1' according to another embodiment of the present invention is shown.

Cable 1' is substantially similar to the cable 1 shown in FIG. 1. However, differently from the cable 1, in the cable 1', the first side 33a of each sector conductor 3 has a blocking recess 34, while the second side 33b of each sector conductor 3 has a blocking tooth 35. Both the blocking recess 34 and the blocking tooth 35 of each sector conductor 3 extend longitudinally along the entire longitudinal length of the sector conductor 3.

Shape and size of the blocking recess 34 match shape and size of the blocking tooth 35.

Blocking teeth 35 and blocking recesses 34 are suitable for "hooking" each sector conductor 3 to the adjacent ones. In particular, the blocking recess 34 of a sector conductor 3 engages with the blocking tooth of the sector conductor facing the first side 33a of the sector conductor 3. Similarly, the blocking tooth 35 of the same sector conductor 3 engages with the blocking recess of the sector conductor facing the second side 33b of the sector conductor 3.

Advantageously, blocking recesses 34 and blocking teeth 35 can provide the cable 1' with an increased stability, especially when the cable is bent.

Figure 3:
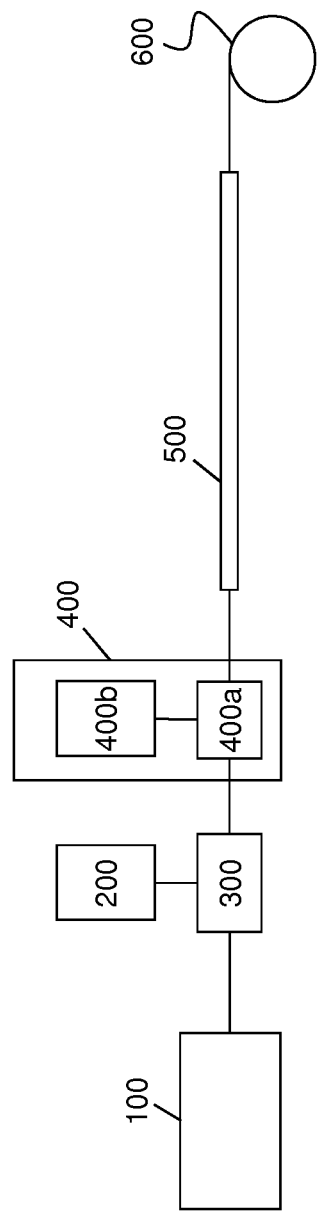
FIG. 3 schematically shows an apparatus for manufacturing the cable of FIG. 1.

FIG. 3 schematically shows an apparatus for manufacturing the cable of FIG. 1.

The apparatus of FIG. 3 comprises a conductor supply tool 100, an optional water-blocking material supply tool 200, a stranding tool 300, an extruder 400, a cooling tool 500, and a collecting spool 600, all connected in cascade. The various parts (tools and extruder) of the apparatus are concatenated each other so as to form a continuous manufacturing line (or plant). The apparatus may comprise further devices not shown in FIG. 3 since they are not relevant to the present description.

The conductor supply tool 100 preferably supplies M+1 conductors, namely the central conductor 2 and the M sector conductors. The conductor supply tool 100 may comprise spools from which the conductors are unwound. The central conductor 2 and the sector conductors 3 are then supplied to the stranding tool 300.

The stranding tool 300 comprises rotating devices, not shown in FIG. 3, that strand the sector conductors 3 around the central conductor 2. As an example, the stranding tool 300 may strand the sector conductors 3 according to a helix pattern thereby forming the conductive core of the cable.

Optionally, during the stranding operation, the stranding tool 300 receives water-blocking material from the water-blocking material supply tool 200, e.g. gel or powder of water-swellable material. For instance, the water-blocking material may be interleaved with the sector conductors 3 just before they are stranded around the central conductor 2, thereby forming layers of water-blocking material 40 as shown in FIG. 1.

The conductive core then passes through the extruder 400. The extruder 400 preferably comprises a supply unit 400b and an extrusion head 400a. The supply unit 400b preferably supplies the extrusion head 400a with the polymeric material suitable for providing the core with insulating and semiconductive layers, said material being well-known to the skilled person.

After extrusion, the layer/s of polymeric material are cooled down through the cooling tool 500. After cooling, the cable 1 is wound on the collecting spool 600.

Tests were carried out on a so produced cable. In particular, some mechanical tests were carried on the cable in order to analyze its performance when subject to bending.

A conductive core comprising six sector conductors and a central conductor was manufactured. The conductive core was surrounded by a 50% Boston tape and a thermoshrinking layer. The overall cross section of the resulting cable was about 2,500 $mm^2$ and the central conductor cross section was of about 78 $mm^2$. The ratio between the area of the central conductor cross section and the area of the overall cross section is then equal to about 1/30. The length of the manufactured cable was about 6,000 mm with a stranding step of 1,600 mm.

The cable was bent on a spool having a diameter equal to about 4.2 m. One end of the cable was fixed to the spool so that it could not rotate about its axis during bending. A dynamometer suitable for measuring the bending stress was fixed to the other end of the cable.

The spool was made to rotate so that the cable was made to bend about the spool. During bending of the cable, the dynamometer measured a bending stress ranging between about 30 Kg and 50 Kg. During bending, the structure of the cable did not split, i.e. the sector conductors remained in reciprocal tight contact and in tight contact also with the central conductor along the whole bent portion of the cable. After bending, the cable was straightened up. The cable exhibited sufficient flexibility to be substantially straightened up with little tensile stress.

The invention claimed is:

1. A high voltage electric cable having a longitudinal axis, the cable comprising:
    a solid conductive core having a first cross sectional area;
    wherein the solid conductive core comprises:
        a solid, central conductor; and
        at least three solid, sector conductors stranded around the central conductor;
    wherein every sector conductor of the cable directly rests against the central conductor,
    wherein the central conductor has a second cross sectional area,
    wherein a ratio of the second cross sectional area to the first cross sectional area is from 1/130 to 1/20,
    wherein the first cross sectional area is greater than 1,000 square millimeters ($mm^2$) and less than 4,000 $mm^2$, and
    wherein a stranding step of the sector conductors is of from 1,200 millimeters (mm) to 1,800 mm.

2. The cable of claim 1, wherein the ratio of the second cross sectional area to the first cross sectional areas is from 1/65 to 1/20.

3. The cable of claim 1, wherein the ratio of the second cross sectional area to the first cross sectional areas is from 1/65 to 1/25.

4. The cable of claim 1, wherein the central conductor and the sector conductors are made of aluminum.

5. The cable of claim 1, wherein each one of the sector conductors rests against adjacent sector conductors.

6. The cable of claim 1, wherein all of the sector conductors have a same size and shape.

7. The cable of claim 1, wherein the conductive core comprises up to nine sector conductors.

8. The cable of claim 1, wherein the central conductor has a circular cross section.

9. The cable of claim 1, wherein each one of the sector conductors has a cross section with a substantially trapezoidal shape, and
    wherein the cross section has a major basis, a minor basis, a first side, and a second side.

10. The cable of claim 9, wherein the major basis is an arc of a circle.

11. The cable of claim 9, wherein the first side has a blocking recess, and
    wherein the second side has a blocking tooth whose shape and size matches a shape and size of the blocking recess.

12. The cable of claim 1, further comprising:
    water blocking material.

13. The cable of claim 1, wherein the cable is a submarine cable.

* * * * *